(12) United States Patent
Kleingeld-MacKenzie

(10) Patent No.: US 10,079,693 B2
(45) Date of Patent: Sep. 18, 2018

(54) STORAGE CLUSTER MANAGEMENT PROXY

(71) Applicant: NetApp, Inc., Sunnyvale, CA (US)

(72) Inventor: Timothy Hank Kleingeld-MacKenzie, Wantirna South (AU)

(73) Assignee: NetApp, Inc., Sunnyvale, CA (US)

( * ) Notice: Subject to any disclaimer, the term of this patent is extended or adjusted under 35 U.S.C. 154(b) by 448 days.

(21) Appl. No.: 14/979,911

(22) Filed: Dec. 28, 2015

(65) Prior Publication Data

US 2017/0187547 A1 Jun. 29, 2017

(51) Int. Cl.
   *G06F 15/173* (2006.01)
   *G06F 15/16* (2006.01)
   *H04L 12/46* (2006.01)
   *H04L 29/08* (2006.01)

(52) U.S. Cl.
   CPC ...... *H04L 12/4633* (2013.01); *H04L 67/1097* (2013.01); *H04L 67/2814* (2013.01); *H04L 67/2833* (2013.01); *H04L 67/2852* (2013.01)

(58) Field of Classification Search
   CPC ............ H04L 12/4633; H04L 67/1097; H04L 67/2814; H04L 67/2833; H04L 67/2852
   USPC ........................................................ 709/225
   See application file for complete search history.

(56) References Cited

U.S. PATENT DOCUMENTS

| | | | |
|---|---|---|---|
| 8,756,338 B1 * | 6/2014 | Potakamuri ........... | G06F 17/302 709/202 |
| 8,769,105 B2 * | 7/2014 | Lacapra ............... | H04L 67/1097 709/213 |
| 8,984,332 B2 * | 3/2015 | Thiel ................. | G06F 17/30575 714/15 |
| 9,577,909 B2 * | 2/2017 | Li ...................... | H04L 41/0893 |
| 9,705,873 B2 * | 7/2017 | Bishop ............... | H04L 63/0823 |
| 9,727,590 B2 * | 8/2017 | Gajic ................ | G06F 17/30289 |
| 9,753,761 B1 * | 9/2017 | Palekar ............... | G06F 9/45558 |
| 9,762,438 B2 * | 9/2017 | Anerousis ........... | H04L 41/0806 |
| 9,842,153 B2 * | 12/2017 | Bishop ............. | G06F 17/30575 |
| 9,846,589 B2 * | 12/2017 | Udupi ................. | G06F 9/45533 |
| 9,870,238 B2 * | 1/2018 | Astete ..................... | G06F 9/455 |
| 9,870,330 B2 * | 1/2018 | Faulkner ................ | G06F 13/36 |
| 9,887,885 B2 * | 2/2018 | Varney ................... | H04L 41/50 |
| 9,900,290 B2 * | 2/2018 | Gluck ................. | H04L 63/0428 |
| 9,906,561 B2 * | 2/2018 | Jain .......................... | H04L 63/20 |
| 9,916,188 B2 * | 3/2018 | Shau .................... | G06F 9/5088 |
| 9,923,818 B2 * | 3/2018 | Cj ........................ | H04L 12/4633 |
| 9,935,827 B2 * | 4/2018 | Jain ..................... | H04L 41/0813 |

(Continued)

*Primary Examiner* — Melvin H Pollack
(74) *Attorney, Agent, or Firm* — Gillam IP PLLC

(57) ABSTRACT

A request is received, from a tenant by a cluster management proxy, to perform a cluster management operation of a cluster that is storing data from multiple tenants that include the tenant. In response to determining that the request is within a group of admissible cluster management requests for the cluster, the request is modified, by the cluster management proxy, to restrict access of the cluster management operation based on an identity of the tenant. The cluster is accessed, by the cluster management proxy, based on the modified request that has restricted access of the cluster management operation. In response to determining that the request is not within the group, the request is tunneled to a Storage Virtual Machine (SVM) assigned to the tenant. The SVM is configured to access the cluster based on the request.

20 Claims, 6 Drawing Sheets

(56) References Cited

U.S. PATENT DOCUMENTS

| | | | |
|---|---|---|---|
| 9,940,154 B2* | 4/2018 | Ramani | G06F 9/45558 |
| 9,952,885 B2* | 4/2018 | Chanda | G06F 9/455 |
| 9,954,793 B2* | 4/2018 | Thakkar | H04L 47/50 |
| 9,954,947 B2* | 4/2018 | Bennett, Jr. | H04L 67/1097 |
| 9,959,147 B2* | 5/2018 | Rider | G06F 9/5061 |
| 9,961,017 B2* | 5/2018 | Jacob | H04L 47/828 |
| 9,965,330 B2* | 5/2018 | Bishop | G06F 9/505 |
| 2017/0187547 A1* | 6/2017 | Kleingeld-MacKenzie | H04L 12/4633 |
| 2017/0201434 A1* | 7/2017 | Liang | H04L 43/08 |
| 2017/0206240 A1* | 7/2017 | Vermeulen | G06F 17/30371 |
| 2017/0230248 A1* | 8/2017 | Broch | H04L 41/0893 |
| 2017/0264493 A1* | 9/2017 | Cencini | H04L 41/0893 |
| 2017/0364973 A1* | 12/2017 | Van Biljon | G06Q 40/00 |
| 2018/0011731 A1* | 1/2018 | Hiltgen | G06F 9/45558 |
| 2018/0013810 A1* | 1/2018 | Gordon | H04N 21/8456 |
| 2018/0032382 A1* | 2/2018 | Kamawat | G06F 9/5088 |
| 2018/0107414 A1* | 4/2018 | Karale | G06F 3/0605 |
| 2018/0109610 A1* | 4/2018 | Einkauf | H04L 67/1076 |
| 2018/0121254 A1* | 5/2018 | Ghare | G06F 9/5083 |

* cited by examiner

STORAGE CLUSTER MANAGEMENT PROXY

BACKGROUND

The disclosure generally relates to the field of data storage, and more particularly to a proxy for processing requests for management of a storage cluster.

A storage service provider can provide data storage in various configurations to different tenants (or clients). A tenant can be any type of business entity (e.g., a company), an individual, etc. that is storing data. In some conventional storage configurations, a storage service provider assigns a given storage cluster to a given tenant for storage of their data. Therefore, there is a one-to-one relationship between the storage cluster and the tenant. In these type of storage configurations, the tenant is typically given greater control over at least some management functionality of the data storage. Examples of management functionality can include creation of data volumes, Quality of Service (QoS) policy management, access to network port information and disk information, etc.

In some other conventional storage configuration, a given cluster can be shared by multiple tenants. However, in this configuration, the tenants are given much less access to management functionality of the data storage because of security concerns of one tenant having access to other clients' data, the physical structures storing the other clients' data, etc.

SUMMARY

In some embodiments, a method includes receiving, from a tenant by a cluster management proxy, a request to perform a cluster management operation of a cluster that is storing data from multiple tenants that include the tenant. The method includes determining whether the request is within a group of admissible cluster management requests for the cluster. In response to determining that the request is within the group, the request is modified, by the cluster management proxy, to restrict access of the cluster management operation based on an identity of the tenant. Also in response to determining that the request is within the group, the cluster is accessed, by the cluster management proxy, based on the modified request that has restricted access of the cluster management operation. In response to determining that the request is not within the group, the request is tunneled to a Storage Virtual Machine (SVM) assigned to the tenant. The SVM is configured to access the cluster based on the request.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

Embodiments of the disclosure may be better understood by referencing the accompanying drawings.

DESCRIPTION

Figure 1:
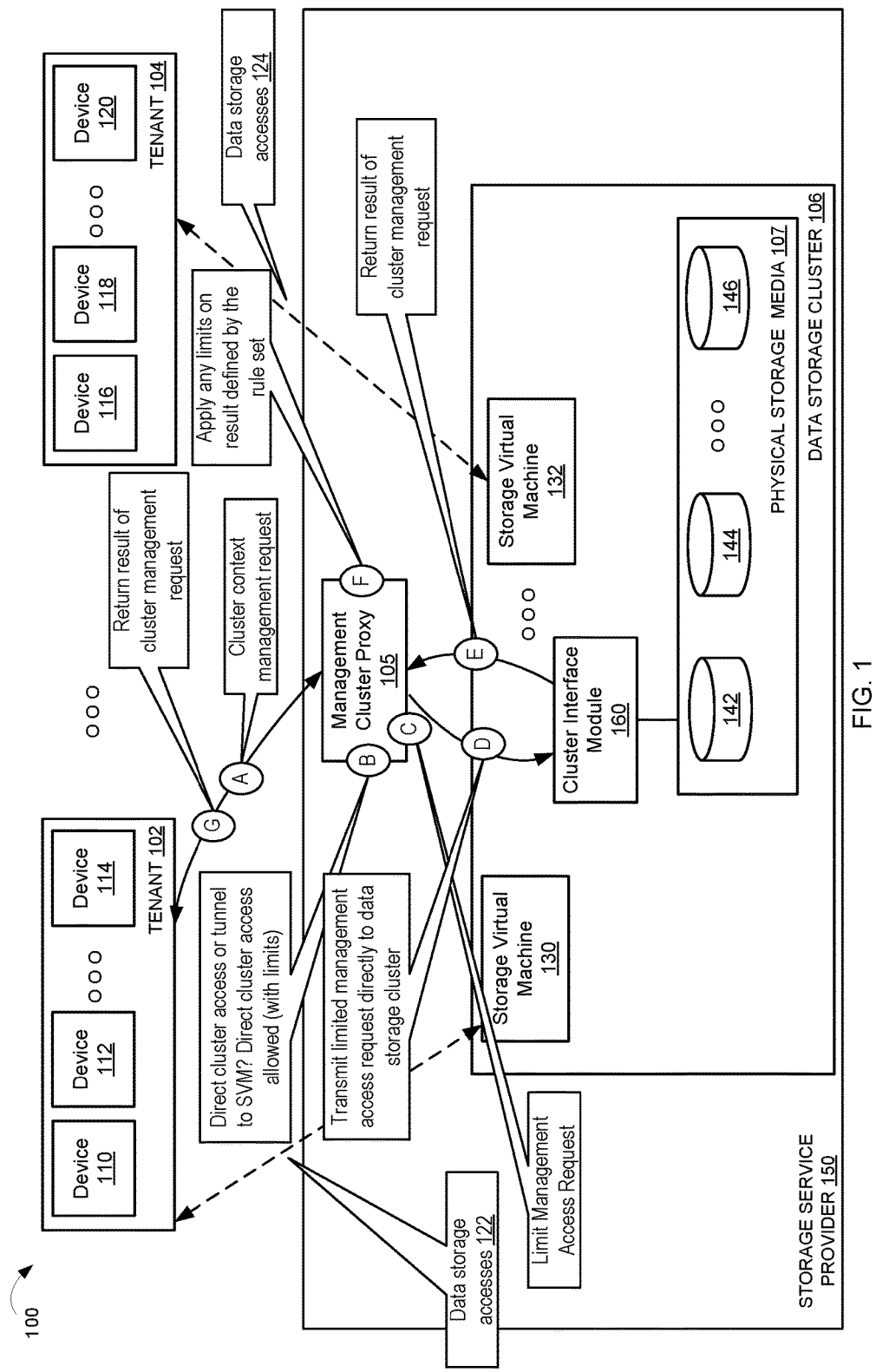
FIG. 1 depicts a system for processing cluster management requests using a first approach having a first set of operations, according to some embodiments.

The description that follows includes example systems, methods, techniques, and program flows that include embodiments of the disclosure. However, it is understood that this disclosure may be practiced without these specific details. For instance, this disclosure refers to example rules in a rule set for restricting cluster management requests. But aspects of this disclosure can be applied to any other rules that would restrict the cluster management requests. In other instances, well-known instruction instances, protocols, structures and techniques have not been shown in detail in order not to obfuscate the description.

Overview

Various embodiments include one or more clusters (hereinafter "a cluster") for storage of data that is shared by multiple tenants (or clients). A cluster can be defined as one or more nodes in a storage server(s) for the storage of data. A cluster can include a number of nodes interconnected that can be configured to provide storage service for data containers or objects (e.g., files) across one or more data volumes. The cluster can be hosted by a storage service provider. Some embodiments include a proxy to allow the storage service provider to provide a management interface that appears to its clients as a client management interface in which the clients have access to various functionality to manage the cluster. Because multiple clients share the same cluster, in some embodiments, the proxy limits a client's visibility and resource access to the client's storage virtual machine and to limited cluster resources outside the client's SVM. The proxy can provide this visibility and resource access without modification or development of a new interface by the tenants. Thus, a tenant's tools used to access the management interface do not need to be modified to limit the tenant's access. Rather, a proxy provides an interface to the tenant that has limits that are effectively transparent to the tenant.

Thus, in some embodiments, the storage service provider can delegate certain management administration functionality (e.g., volume move functionality, Quality of Service (QoS) policy management, network port information, disk information, etc.) to each tenant. Such delegation is provided to each tenant while still limiting the tenant to management and access to their own data (and precluding a tenant from management and access of other tenants' data). The tenant's storage administrator can then manage various parts of the tenant's storage (e.g., volume move functionality, etc.) directly using current management tools. For example, the tenant's storage administrator can then manage volumes, shares, Logical Unit Numbers (LUNs), etc., using existing tenant tools. Thus, some embodiments use a proxy to allow a storage service provider to expose limited information and functionality to the tenants with defined constraints. The proxy also enables storage management tools to operate correctly without having to be modified to interface with custom Application Program Interfaces (APIs) for management of the cluster.

Accordingly, some embodiments provide access to more functionality in a limited cluster context than is available from functionality in a SVM context. As further described below, this expanded functionality for a cluster shared by multiple tenants includes functionality that is generally available to a tenant that occupies an entire cluster.

Example System

Figure 2:
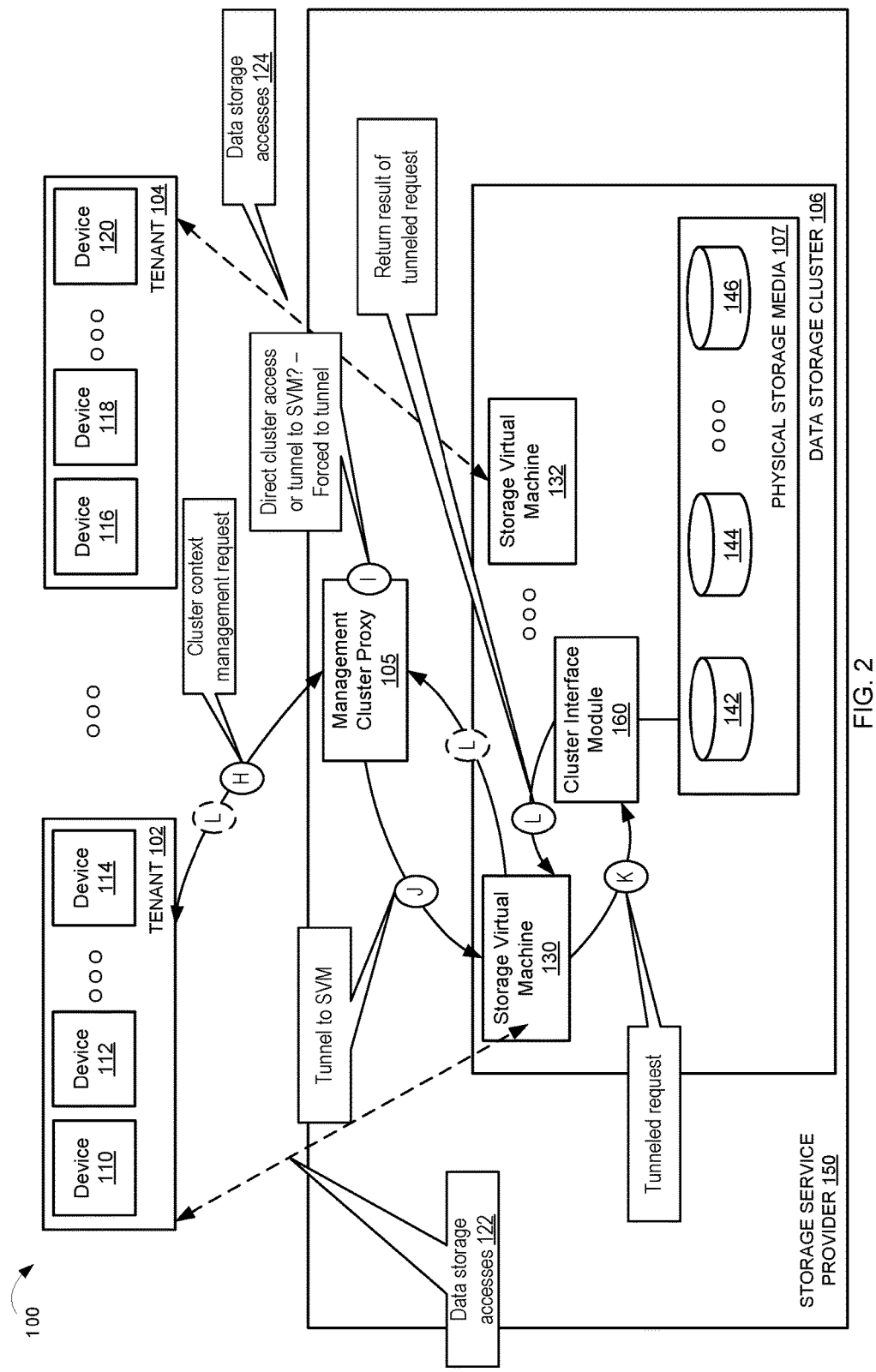
FIG. 2 depicts the system for processing cluster management requests using a second approach having a second set of operations, according to some embodiments.
Figure 3:
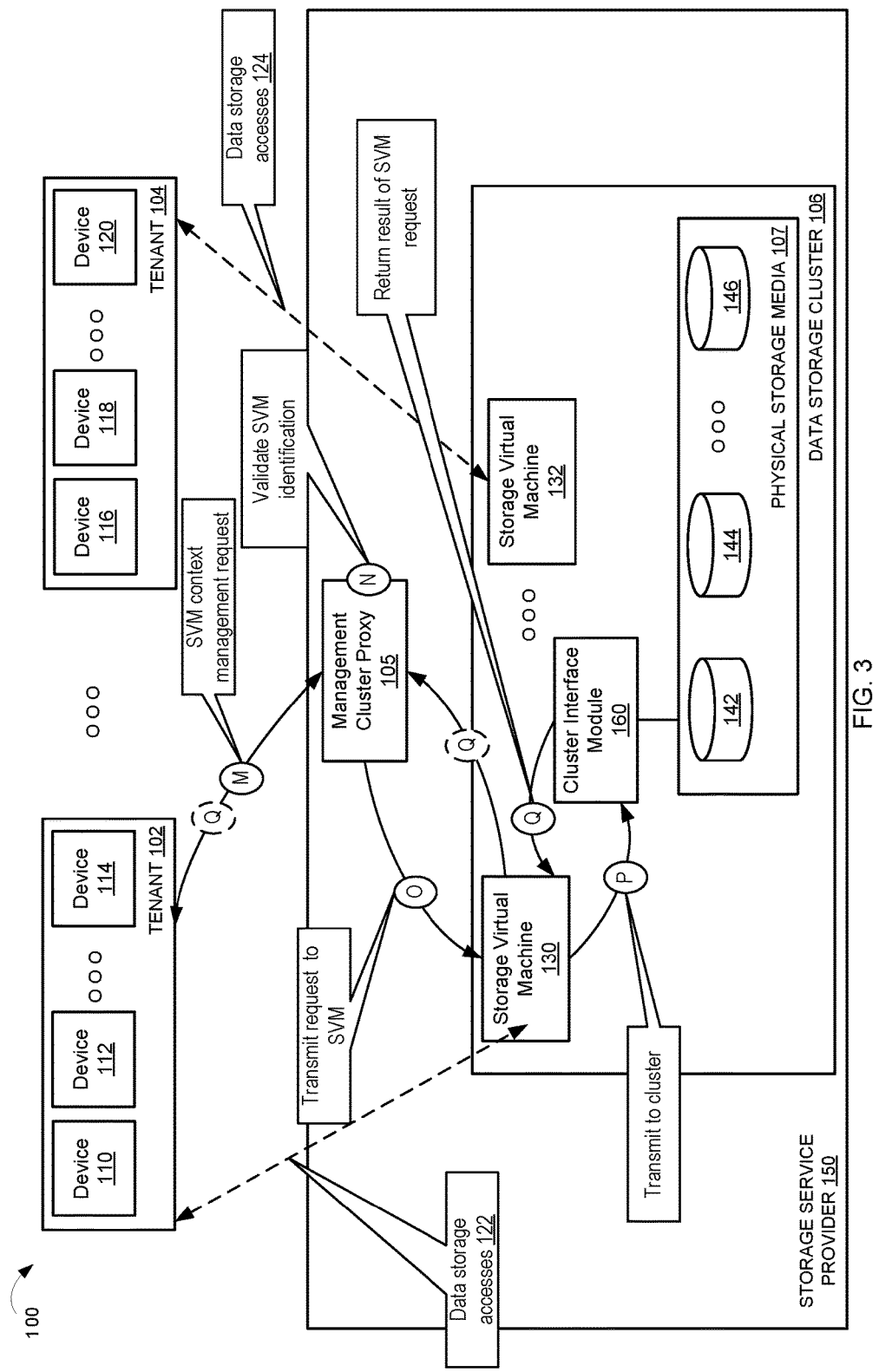
FIG. 3 depicts the system for processing cluster management requests using a third approach having a third set of operations, according to some embodiments.
Figure 4:
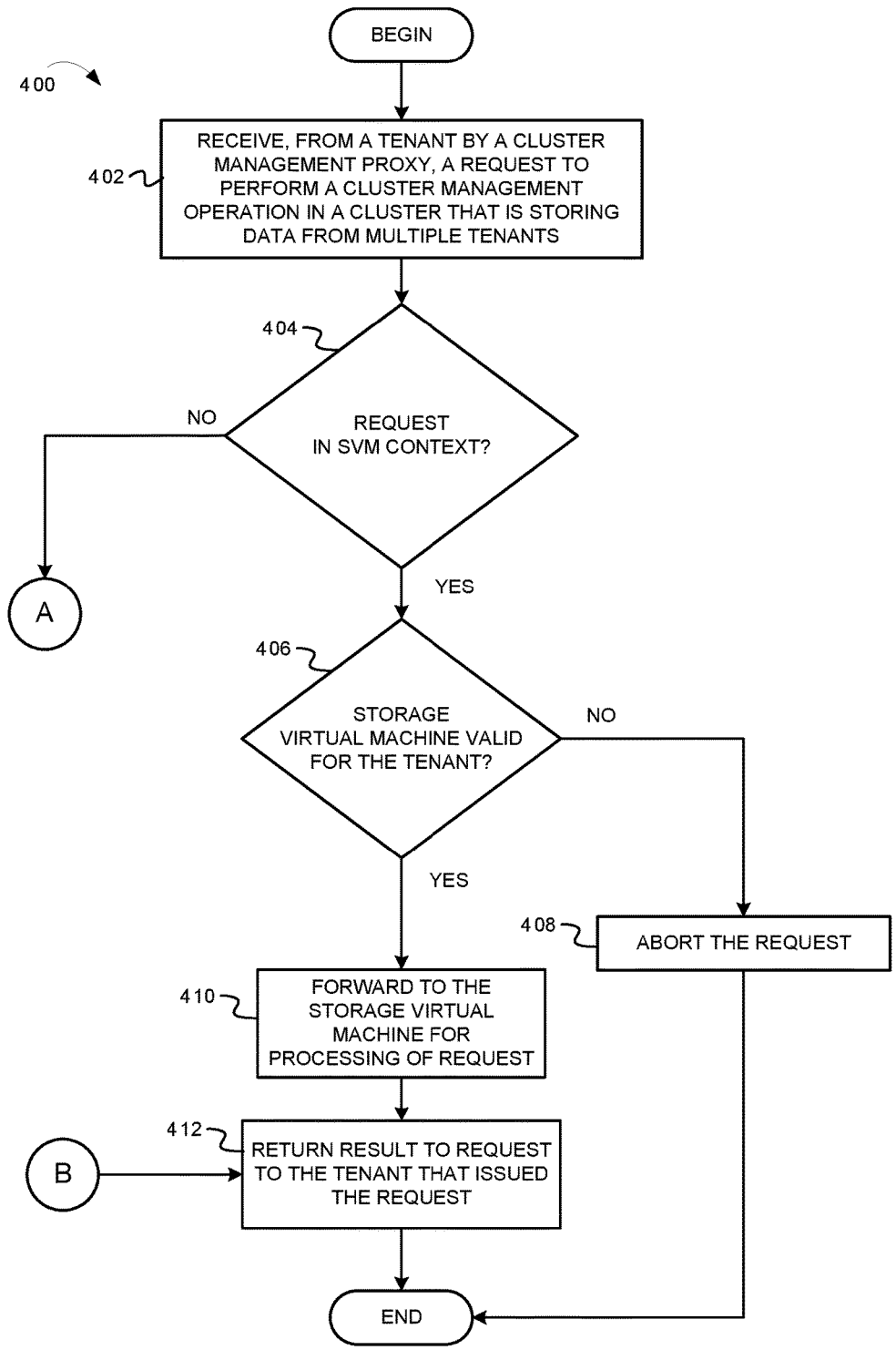
FIGS. 4-5 depicts flowcharts for processing storage cluster management requests using a proxy, according to some embodiments.

FIGS. 1-3 depict a system that includes operations for processing cluster management requests. In these examples, FIGS. 1-3 depict a same system (a system 100). However, each of FIGS. 1-3 depicts a different approach for processing cluster management requests using a different set of stages (operations). FIG. 1 depicts a first approach for the system 100 to process the cluster management requests using operational stages A-G (see subsection A below). FIG. 2 depicts a second approach for the system 100 to process the cluster management requests using operational stages H-L (see subsection B below). FIG. 3 depicts a third approach for the system 100 to process the cluster management requests using operational stages M-Q (see subsection C below).

Each of FIGS. 1-2 depict a cluster management request sent by a tenant such that the tenant is intending that the request is to be processed in a cluster context. A cluster context can be defined as a context for processing the requests that assumes a direct cluster access for management of the cluster. In some embodiments, in a cluster context, the tenant assumes they have access to the entire cluster. Thus, for example, the request is not limited to access particular aggregates that are only associated with this particular tenant. FIG. 1 depicts stages wherein a management cluster proxy 105 allows the request to be processed in a cluster context after modification to limit the request and/or a limit a result of the request. This modification can be based on the particular tenant that issued the request. FIG. 2 depicts stages wherein a management cluster proxy 105 precludes processing of the request in the cluster context. Rather, FIG. 2 depicts stages of operations that redirect the request to the SVM associated with the tenant (thereby processing the request in an SVM context (further described below)).

In contrast to FIGS. 1-2, FIG. 3 depicts a cluster management request sent by a tenant such that the tenant is intending that the request is to be processed in an SVM context. A SVM context can be defined as a context for processing the requests that is limited to access of the cluster defined by the SVM.

Thus, the management cluster proxy 105 can provide management API access of the cluster in a cluster (or node) context or an SVM context. Specifically, the management cluster proxy 105 can provide management API access via a logical network interface associated with the cluster—cluster management logical interface. The cluster management logical interface provides a full API access for all of the resources in the cluster—the cluster context. Also, while described in reference to a cluster level access, in some other embodiments, the management cluster proxy 105 can provide management API access via a logical network interface associated with each node in the cluster—node management logical interface. The node management logical interface provides a full API access for all of the resources in an individual node—the node context.

In contrast to the cluster or node context, the management cluster proxy 105 can also provide management API access via a logical network interface associated with a specific SVM (the SVM context). In contrast to the interface for the cluster/node context, the SVM logical network interface has a limited API and can only view/modify logical storage elements directly belonging to that SVM. In some embodiments, in the SVM context, no physical resource APIs are available and not all logical resource APIs are present (e.g. QoS policy management, volume moves, etc.). Additionally, in some embodiments, the APIs (e.g., management access requests) available for either or both the cluster/node context or the SVM context can further be restricted on a per-user basis FIGS. 1-3 depict the system 100 that includes multiple tenants (tenants 102-104) and components for a storage service provider 150. The storage service provider 150 provides data storage for the tenants 102-104. The storage service provider includes the management cluster proxy 105 and a data storage cluster 106. Each of the tenants 102 and 104 represent one or more devices that can be part of a same logical grouping (e.g., a business entity, individual, etc.) that stores data in the data storage cluster 106. The tenant 102 includes a number of devices (a device 110, a device 112, and a device 114). The tenant 104 also includes a number of devices (a device 116, a device 118, and a device 120). Each of the devices 110-114 and the devices 116-120 are communicatively coupled to the management cluster proxy 105 and the data storage cluster 106. The data storage cluster 106 includes multiple SVMs (SVMs 130-132), a cluster interface module 160, and physical storage media 107. The SVMs 130-132, the management cluster proxy 105, and the cluster interface module 160 can be software, hardware, firmware or a combination thereof.

In some embodiments, there is a one-to-one relationship between the tenants and the SVMs. In this example, the tenant 102 is associated with the SVM 130, and the tenant 104 is associated with the SVM 132. The SVMs provide an interface for the devices in the tenants to store and read data in the physical storage media 107. Each SVM can have a defined number of aggregates in the cluster in which volumes can be created. Each SVM can securely isolate the shared virtualized data storage and network and can appear as a single dedicated server to its tenant. Also, each SVM can have a separate administrator authentication domain and can be managed independently by an SVM administrator. The multiple SVMs can coexist in a single cluster without being bound to any node in a cluster. However, the SVMs can be bound to the physical cluster on which they exist.

The physical storage media 107 can comprise various media, data storage devices (e.g., hard disk drives), etc. for storage of data. In this example, the physical storage media 107 includes a number of data storage devices (data storage devices 142, 144, and 146).

The management cluster proxy 105 can provide a management interface to process requests to perform management operations in the data storage cluster 106 through the cluster interface module 160. In some embodiments, the requests can be cluster management Application Program Interface (API) requests. As further described below, the management cluster proxy 105 can limit the requests that are then forwarded to the cluster interface module 160. The cluster interface module 160 can then return a result of the limited request back to the management cluster proxy 105. The management cluster proxy 105 can return the result to the device in the tenant from which the request originated.

Alternatively, the management cluster proxy 105 can preclude sending the request to the cluster interface module 160. Instead, the management cluster proxy 105 can tunnel the request to the SVM associated with the tenant from which the request originated. The SVM can then process the request and return the result of the request back to the management cluster proxy 105. The management cluster proxy 105 can then return the result to the device in the tenant from which the request originated.

The cluster management requests are different from the requests to read to and write data from the data storage cluster 106 (data access requests). As shown, the cluster management requests are received and processed by the management cluster proxy 105. However, the data access requests are communicated with the devices in the tenants and their associated SVM. With reference to FIG. 1, the devices 110-114 in the tenant 102 communicate with the SVM 130 (see data storage accesses 122). Similarly, the devices 116-120 in the tenant 104 communicate with the SVM 132 (see data storage accesses 124).

As described above, FIGS. 1-3 are annotated with a series of letters. These numbers represent operational stages. Although these stages are ordered for this example, the stages illustrate one example to aid in understanding this disclosure and should not be used to limit the claims. Subject matter falling within the scope of the claims can vary with respect to the order and some of the operations.

A. Operational Stages—Processing Cluster Context Request→Restricted Request/Response FIG. 1 depicting a first approach for the system 100 to process the cluster management requests using operational stages A-G is now described. FIG. 1 depicts a cluster management request sent by the device 110 of the tenant 102 such that the device of the tenant is intending that the request is to be processed in a cluster context.

At stage A, the management cluster proxy 105 receives a cluster management request from the device 110 of the tenant 102. In particular, the device 110 is transmitting a request based on an assumption that the entire cluster is accessible. The device 110 is expecting to interact with a whole cluster-level interface. In other words, the request provided by the device 110 does not include limits or restrictions on which part of the cluster to access. Examples of the type of requests include volume move functionality, Quality of Service (QoS) policy management, network port information, disk information, aggregate space information, cluster/SVM peering, etc. For example, the management request may include a request for storage availability or consumed for all aggregates in the cluster. The device 110 can create a request that is based on various protocols (e.g., Network File System (NFS), Internet Small Computer Systems Interface (iSCSI), etc.).

At stage B, the management cluster proxy 105 determines whether the request can be processed as a direct cluster access or is to be tunneled to the SVM. In some embodiments, the management cluster proxy 105 can make this determination based on whether the request is within a group of admissible direct cluster management requests for the cluster. The defined group of requests can be specific to a particular tenant. In other words, each tenant (or at least some of the tenants) can have a different group of admissible direct cluster management requests. Alternatively, the defined group of requests can be specific to a particular cluster. In other words, each cluster (or at least some of the clusters) can have a different group of admissible direct cluster management requests. Alternatively, the defined group of requests can be globally applied to all tenants in the system.

In some embodiments, the management cluster proxy 105 can determine a configuration for the request based on the network address from which the request is received (the network address of the tenant) and the username of the request. In this example, the network address and the username of the request would identify the configuration for the tenant 102. The configuration would include the following:

a password to validate the user,
the target cluster,
the SVM associated with the tenant, and
if the request is within the group of admissible direct cluster management requests for the cluster, a rule set that can limit or restrict the request and/or the response In the example depicted in FIG. 1, the management cluster proxy 105 determines that the request is within the group of admissible direct cluster management requests for the cluster. In some embodiments, a number of rules are defined for the group of admissible direct cluster management requests for the cluster (see examples below). For example, the rules can be defined in a configuration file. If there is at least one rule for the particular request, the management cluster proxy 105 can determine that the request is within the group of admissible direct cluster management requests for the cluster. In this situation, the request is to be handled in a cluster context (bypassing the SVM context). As further described below, within the cluster context, the request and/or the result of the request can be modified. For example, the request can be modified to be limited to access the physical structure within the cluster based on which tenant sent the request. Also further described below, different rule sets can be assigned to a request to modify the request and the result of the request.

At stage C, the management cluster proxy 105 limits the cluster management request based on the rule set provided by the configuration for this request (see stage B above). The management cluster proxy 105 can limit both the cluster management request and a result provided in response to the request. Each request can have a different rule set. The following is an example syntax for the "allow" rule:

Allow: request-A

As shown, the request "request-A" is allowed to be executed in the cluster context. The following is an example of an "allow" rule to allow the tenant to access information about aggregates in the cluster:

Allow: aggr-get-iter

An "allow" rule allows the request to be executed in the cluster context. Any request that does not include an "allow" rule is tunneled to the associated SVM for the tenant. Thus if the request is tunneled, the context of the request is changed from a cluster context to an SVM context. Tunneling to the SVM and processing the request in the SVM context is depicted in FIG. 2, which is described in more detail below.

Another example of a rule for a request is a "limit" rule. A "limit" rule limits the values that a specific input parameter for a given request may have. If the parameter is present, then elements that match the value list are allowed through to the cluster. If the parameter is absent, then all of the elements that are defined to be in a value list for the parameter will be passed through to the cluster. The following is an example syntax for the "limit" rule:

Limit: request-A input-parameter-B value-X|value-Y|value-Z

As shown, there is a limit on the request named "request-A", in which the input parameter "input-parameter-B" for this request is limited to having values of "value-X", "value-Y", and "value-Z".

The following is an example of a "limit" rule to limit the tenant to only view their aggregates in the cluster:

Limit: aggr-get-iter query/aggr-attributes/aggregate-name <aggr-list>

In this example, the input parameter "query/aggr-attributes/aggregate-name" is limited to those aggregates listed in the list "<aggr-list>".

Another example of a rule for a request is a "force" rule. A "force" rule forces the given input parameter to a specific value, regardless of whether the input parameter is present in the request. The following is an example syntax for the "force" rule:

Force: request-A input-parameter-B value-X

As shown, the input parameter "input-parameter-B" for the request "request-A is forced to have a value of "value-X". The following is an example of a "force" rule to force the input parameter "vserver" for the request "security-login-role-get" to have a value of "vserverX"":

Force: security-login-role-get vserver <vserverX>

Another example of a rule for a request is a "replace input" rule. A "replace input" rule replaces values in a given input parameter (changing an original value to a replacement value). In some embodiments, missing input parameters or those values that do not match are passed through unchanged. The following is an example syntax for the "replace input" rule:

ReplaceInput: request-A input-parameter-B original-value replacement-value

In this example, the input parameter "input-parameter-B" for the request "request-A had a value of "original-value". Enforcing this rule causes the "original-value" to be replaced with a value of "replacement-value."

Another example of a rule for a request is a "replace output" rule. A "replace output" rule replaces values in a given output field. In some embodiments, if the replacement-value contains '<mask[-length]>' then the original value is hashed together with the SVM name to generate a new value (limited in size to the given length) to present to the tenant. This allows masking of serial numbers and other information that the storage service provider wants to obfuscate. The following is an example syntax for the "replace output" rule:

ReplaceOutput: request-A output-field-C original-value replacement-value

In this example, the output field "output-field-C" that is part of the result from the request "request-A" had a value of "original-value". Enforcing this rule causes the "original-value" to be replaced with a value of "replacement-value." The following is an example of a "replace output" rule:

ReplaceOutput: system-node-get-iter attributes-list/node-details-info/node-serial-number*9<mask-8>

In this example, the request to get information about the system node "system-node-get-iter" includes an output that provides the serial number of the system node "attributes-list/node-details-info/node-serial-number". Enforcing of this "replace output" rule causes the node serial number to be masked to obfuscate the actual value of the node serial number.

Another example of a rule for a request is a "fake" rule. A "fake" rule provides a result without sending the request to the cluster or receiving a result of the request back from the cluster. The following is an example syntax for the "fake" rule:

Fake: request-A fake-result-X

In this example, a request "request-A" is received by the management cluster proxy 105. In response, the management cluster proxy 105 returns a fake result "fake-result-X" to the tenant without forwarding the request to the cluster for providing a result. The following is an example of a "fake" rule:

Fake: storage-adapter-get-adapter-list <adapter-list/>

In this example, the request for a list of the storage adapters in the cluster "storage-adapter-get-adapter-list" returns an empty list—"<adapter-list/>".

The different example rules can be combined to create a rule set. For example, an "allow" rule can be combined with a "limit" rule:

Allow: aggr-get-iter
    Limit: aggr-get-iter query/aggr-attributes/aggregate-name <aggr-list>

In this example, two different rules are applied to the request "aggr-get-iter" that is requesting information about the aggregates in the cluster. The first rule ("allow" rule) allows the tenant to access information about aggregates in the cluster: The second rule ("limit" rule) limits the input parameter "query/aggr-attributes/aggregate-name" to those aggregates listed in the list "<aggr-list>".

At stage D, the management cluster proxy 105 can then transmit the limited cluster management request directly to the data storage cluster. In some embodiments, the request that is transmitted is not modified. Rather, a result of the cluster management request is modified. For example, see the "replace output" rule described above. The management cluster proxy 105 transmits the cluster management request to the cluster interface module 160 after the rules in the rule set have been applied.

At stage E, the cluster interface module 160 returns a result of the cluster management request to the management cluster proxy 105. The cluster interface module 160 can query the physical storage media 107 to provide the result. Alternatively or in addition, the cluster interface module 160 can have the information in local storage or memory to provide the result (without a query to the physical storage media 107). For example, the result can include serial numbers of a node in the cluster, information about aggregates in the cluster, etc.

At stage F, the management cluster proxy 105 applies any limits on the result defined by the rule set. For example (as described above), a rule can include replacing an output value for a field in the result with a replacement value.

At stage G, the management cluster proxy 105 can then return the result of the cluster management request to the device 110 in the tenant 102 from which the request was originated.

B. Operational Stages—Processing Cluster Context Request→Tunnel to SVM

FIG. 2 depicting a second approach for the system 100 to process the cluster management requests using operational stages H-L is now described. Similar to FIG. 1, FIG. 2 depicts a cluster management request sent by the device 110 of the tenant 102 such that the device of the tenant is intending that the request is to be processed in a cluster context. However, in this example, context is changed from a cluster context to an SVM context.

At stage H, the management cluster proxy 105 receives a cluster management request from the device 110 of the tenant 102. In particular, the device 110 is transmitting a request based on an assumption that the entire cluster is accessible. The device 110 is expecting to interact with a whole cluster-level interface. In other words, the request provided by the device 110 does not include limits or restrictions on which part of the cluster to access.

At stage I, the management cluster proxy 105 determines whether the request can be processed as a direct cluster access or is to be tunneled to the SVM. In some embodiments, the management cluster proxy 105 can make this determination based on whether the request is within a group of admissible direct cluster management requests for the cluster. As described above, the management cluster proxy 105 determines if the cluster management request is within the group of admissible direct cluster management requests for the cluster based on the configuration for the tenant. The request is considered to be within the group of admissible direct cluster management requests if there is at least one rule for the request (e.g., an "allow" rule, a "limit" rule, etc.). In the example depicted in FIG. 2, the management cluster proxy 105 determines that the request is not within the group of admissible direct cluster management requests for the cluster.

At stage J, the management cluster proxy 105 tunnels the cluster management request to the SVM associated with the tenant from which the request originated. In this example, the management cluster proxy 105 tunnels the request to the SVM 130. Thus, the management cluster proxy 105 is changing the context of the request from a cluster context to an SVM context. In some embodiments, the management cluster proxy 105 tunnels the request by setting a value in a header of the request to indicate that the request is to be executed in a context for the SVM for this client. Thus, the request is now limited on what type of management accesses can be performed in the cluster based on what accesses can be performed by the SVM. For example, the SVM can only view or modify logical storage elements directly belonging to this SVM. Also, in some embodiments, the modifications to the request or result as described for the cluster context described above can also be performed in the SVM context. Thus, the management cluster proxy 105 can modify the requests and/or the result prior to and after the management access requests are tunneled to the SVM.

At stage K, the SVM 130 transmits the tunneled request to the cluster interface module 160.

At stage L, the cluster interface module 160 returns a result of the cluster management request to the SVM 130. The cluster interface module 160 can query the physical storage media 107 to provide the result. Alternatively or in addition, the cluster interface module 160 can have the information in local storage or memory to provide the result (without a query to the physical storage media 107). For example, the result can include serial numbers of a node in the cluster, information about aggregates in the cluster, etc. The SVM 130 forwards the result to the management cluster proxy 105. The management cluster proxy 105 can then return the result of the cluster management request to the device 110 in the tenant 102 from which the request was originated.

C. Operational Stages—Processing SVM Context Request→Forward to SVM

FIG. 3 depicting a third approach for the system 100 to process the cluster management requests using operational stages M-Q is now described. In contrast to FIGS. 1-2, FIG. 3 depicts a cluster management request sent by the device 110 of the tenant 102 such that the device of the tenant is intending that the request is to be processed in an SVM context.

At stage M, the management cluster proxy 105 receives a cluster management request in an SVM context from the device 110 of the tenant 102. In particular, the device 110 is transmitting a request based on an assumption that the request is providing a result that is limited to an SVM context. Thus, the request provided by the device 110 is limited to management accesses that can be performed in the cluster based on what accesses can be performed by the SVM. For example, the SVM can only view or modify logical storage elements directly belonging to this SVM.

At stage N, the management cluster proxy 105 validates the identification of the SVM that is designated in the cluster management request. This validation is to ensure that a tenant creates cluster management requests in the SVM context that is limited to the SVM to which the tenant is associated. Accordingly, if the cluster management request is received on a network address that identified for tenant A, the SVM identified in the cluster management request needs to be the identification of the SVM associated with tenant A. If identification of the tenant cannot be validated, processing of the cluster management request is aborted and a failure result is returned to the device 110 of the tenant 102. With reference to the example in FIG. 3, if identification of the SVM in the cluster management request from the device 110 of the tenant 102 is the SVM 130, the identification of the SVM is validated and processing of the cluster management request continues. However, if identification of the SVM in the cluster management request from the device 110 of the tenant 102 is the SVM 132, processing of the cluster management request is aborted.

At stage O, the cluster management request is tunneled to the SVM that was validated at stage N. In this example, the management cluster proxy 105 transmits the request to the SVM 130. Thus, the request is limited on what type of management accesses can be performed in the cluster based on what accesses can be performed by the SVM.

At stage P, the SVM 130 transmits the request to the cluster interface module 160.

At stage Q, the cluster interface module 160 returns a result of the cluster management request to the SVM 130. The cluster interface module 160 can query the physical storage media 107 to provide the result. Alternatively or in addition, the cluster interface module 160 can have the information in local storage or memory to provide the result (without a query to the physical storage media 107). For example, the result can include serial numbers of a node in the cluster, information about aggregates in the cluster, etc. The SVM 130 forwards the result to the management cluster proxy 105. The management cluster proxy 105 can then return the result of the cluster management request to the device 110 in the tenant 102 from which the request was originated.

Example Proxy Operations for Storage Cluster Management

To further illustrate operations of the system 100 of FIGS. 1-3, FIGS. 4-5 depicts flowcharts for processing storage cluster management requests using a proxy, according to some embodiments. A flowchart 400 of FIG. 4 and a flowchart 500 of FIG. 45 are described with reference to FIGS. 1-3. Operations of the flowcharts 400-500 continue between each other through transition points A, B, and C. Operations of the flowchart 400 and the flowchart 500 can be performed by software, firmware, hardware or a combination thereof (see for example the management cluster proxy 105 in FIGS. 1-3). The operations of the flowchart 400 start at block 402.

At block 402, a request is received to perform a cluster management operation in a cluster that is storing data from multiple tenants. With reference to FIGS. 1-3, the management cluster proxy 105 receives a cluster management request from the device 110 of the tenant 102. The cluster management request can be in a cluster context or an SVM context (as described above). The device 110 can create a request that is based on various protocols (e.g., Network File System (NFS), Internet Small Computer Systems Interface (iSCSI), etc.).

At block 404, a determination of whether the cluster management request is in an SVM context. With reference to FIGS. 1-3, the management cluster proxy 105 can make this determination. In some embodiments, the management cluster proxy 105 can make this determination based on whether the request includes an indicator that the request is to be processed in the SVM context. Thus, the device 110 in the tenant 102 that transmitted the request to the management cluster proxy 105 can set the value to indicate that the request is to be processed in the SVM context for the SVM associated with the tenant 102 (instead of a cluster context). For example, the request can include a value in the header to indicate that this request is to be processed in the SVM context (not a cluster context). If the cluster management request is not in the SVM context, operations of the flowchart 400 continue at transition point A, which continues at transition point A of the flowchart 500 (further described below). If the cluster management request is in the SVM context, operations of the flowchart 400 continue at block 406.

At block 406, a determination is made of whether the SVM identified in the cluster management request is valid for the tenant. With reference to FIGS. 1-3, the management cluster proxy 105 can make this determination. For example, the management cluster proxy 105 validates the identification of the SVM that is designated in the cluster management request based on the SVM associated with the tenant from which the request originated (the tenant 102). This validation is to ensure that a tenant creates cluster management requests in the SVM context that is limited to the SVM to which the tenant is associated. Accordingly, if the cluster management request is received on a network address that identified for tenant A, the SVM identified in the cluster management request needs to be the identification of the SVM associated with tenant A. If the SVM identified in the cluster management request is not valid for the tenant, operations of the flowchart 400 continue at block 408. If the SVM identified in the cluster management request is valid for the tenant, operations of the flowchart 400 continue at block 410.

At block 408, the cluster management request is aborted. With reference to FIGS. 1-3, the management cluster proxy 105 can abort the request. The management cluster proxy 105 can return a failure result to the tenant from which the request was originated. For example, the management cluster proxy 105 can return a failure result to the device 110 in the tenant 102. Operations of the flowcharts 400-500 are then complete.

At block 410, the cluster management request is transmitted to the designated SVM for processing by the SVM. With reference to FIGS. 1-3, the management cluster proxy 105 can forward the cluster management request to the SVM that has been validated. In this example, the management cluster proxy 105 can forward the cluster management request to the SVM 130. The SVM 130 transmits the request to the cluster interface module 160. The cluster interface module 160 returns a result of the cluster management request to the SVM 130. The cluster interface module 160 can query the physical storage media 107 to provide the result. Alternatively or in addition, the cluster interface module 160 can have the information in local storage or memory to provide the result (without a query to the physical storage media 107). The SVM forwards the result to the management cluster proxy 105. Operations of the flowchart 400 continue at block 412.

At block 412, the result of the request is returned to the tenant that issued the request. With reference to FIGS. 1-3, the management cluster proxy 105 can transmit the result of the request to the device 110 of the tenant 102 from which the request was originated. The operations of the flowcharts 400-500 along this path are complete.

Figure 5:
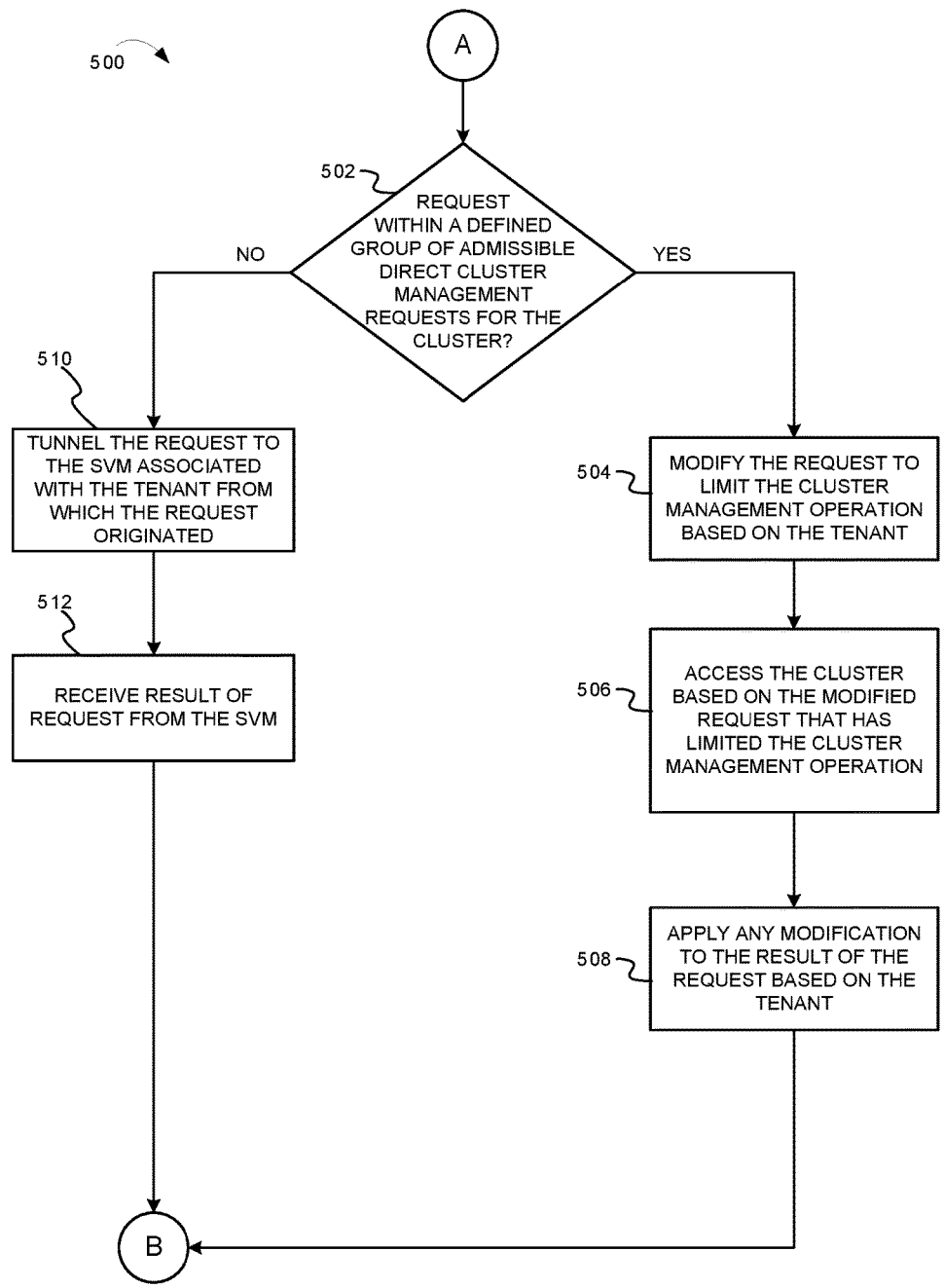

The flowchart 500 of FIG. 5 is now described. From the transition point A, operations of the flowchart 500 continue at block 502. In particular, this point of the flowchart 500 is a continuation from the transition point A of the flowchart 400 in response to the determination that the request is not within an SVM context. Thus, in this example, the assumption can be made that the device in the tenant that originated the request is attempting to create a request in a cluster context.

At block 502, a determination is made of whether the request is within a defined group of admissible direct cluster management requests for the cluster. With reference to FIGS. 1-3, the management cluster proxy 105 can make this determination. In some embodiments, a number of rules are defined for the group of admissible direct cluster management access requests for the cluster (see examples described above—"allow", "limit", etc.). For example, the rules can be defined in a configuration file. If there is at least one rule for the particular request, the management cluster proxy 105 can determine that the request is within the group of admissible direct cluster management requests for the cluster. Also, if the request is within the group of admissible direct cluster management requests for the cluster, the request is considered to be within a cluster context. Conversely, if there is no a rule for the particular request, the management cluster proxy 105 can determine that the request is not within the group of admissible direct cluster management requests for the cluster. If the request is not within the group of admissible direct cluster management requests for the cluster, the request is considered to be within an SVM context. If the request is within a defined group of admissible direct cluster management requests for the cluster, operations of the flowchart 500 continue at block 504. Otherwise, operations of the flowchart 500 continue at block 510.

At block 504, the request is modified to limit the cluster management operation based on the tenant. With reference to FIGS. 1-3, the management cluster proxy 105 can modify the request. For example (as described above), the management cluster proxy 105 can limit the cluster management request based on the rule set provided by the configuration for this request (see stage B in FIG. 1 described above). The management cluster proxy 105 can limit both the cluster management access request and a result provided in response to the request. Each request can have a different rule set. As described above, examples of modifications to limit the request include "limit", "force", "replace input", "replace output", and "fake." Operations of the flowchart 500 continue at block 506.

At block 506, the cluster is accessed based on the modified request that has limited the cluster management operation. With reference to FIGS. 1-3, the management cluster proxy 105 can access the cluster. For example, the management cluster proxy 105 can transmit the cluster management request to the cluster interface module 160 after the rules in the rule set have been applied. As described above, the cluster interface module 160 returns a result of the cluster management request to the management cluster proxy 105. Operations of the flowchart 500 continue at block 508.

At block 508, any modification to the result of the request is applied based on the tenant. With reference to FIGS. 1-3, the management cluster proxy 105 can perform any modification to the result. The modification can be limits on the result defined by the rule set. For example (as described above), a rule can include replacing an output value for a field in the result with a replacement value. Operations of the flowchart 500 continue at transition point B, which continues at transition point B of the flowchart 400. As shown, from transition point B of the flowchart 400, operations of the flowchart 400 continue at block 412, wherein the result of the request is returned to the tenant that issued the request (as described above).

At block 510 (if the request is not within a defined group of admissible direct cluster management requests for the cluster from the decision at block 502), the request is tunneled to the SVM associated with the tenant from which the request originated. With reference to FIGS. 1-3, the management cluster proxy 105 can tunnel the request. From the example depicted in FIG. 2, the management cluster proxy 105 tunnels the request to the SVM 130. Thus, the management cluster proxy 105 is changing the context of the request from a cluster context to an SVM context. In some embodiments, the management cluster proxy 105 tunnels the request by setting a value in a header of the request to indicate that the request is to be executed in a context for the SVM for this client. Thus, the request is now limited on what type of management accesses can be performed in the cluster based on what accesses can be performed by the SVM. The SVM 130 then transmits the tunneled request to the cluster interface module 160. The cluster interface module 160 returns a result of the cluster management request to the SVM 130. Operations of the flowchart 500 continue at block 512.

At block 512, a result of the request is received from the SVM. With reference to FIGS. 1-3, the management cluster proxy 105 can receive the result of the request from the SVM 130. Operations of the flowchart 500 continue at transition point B, which continues at transition point B of the flowchart 400. Operations of the flowchart 500 continue at transition point B, which continues at transition point B of the flowchart 400. As shown, from transition point B of the flowchart 400, operations of the flowchart 400 continue at block 412, wherein the result of the request is returned to the tenant that issued the request (as described above).

Example Computer Device

Figure 6:
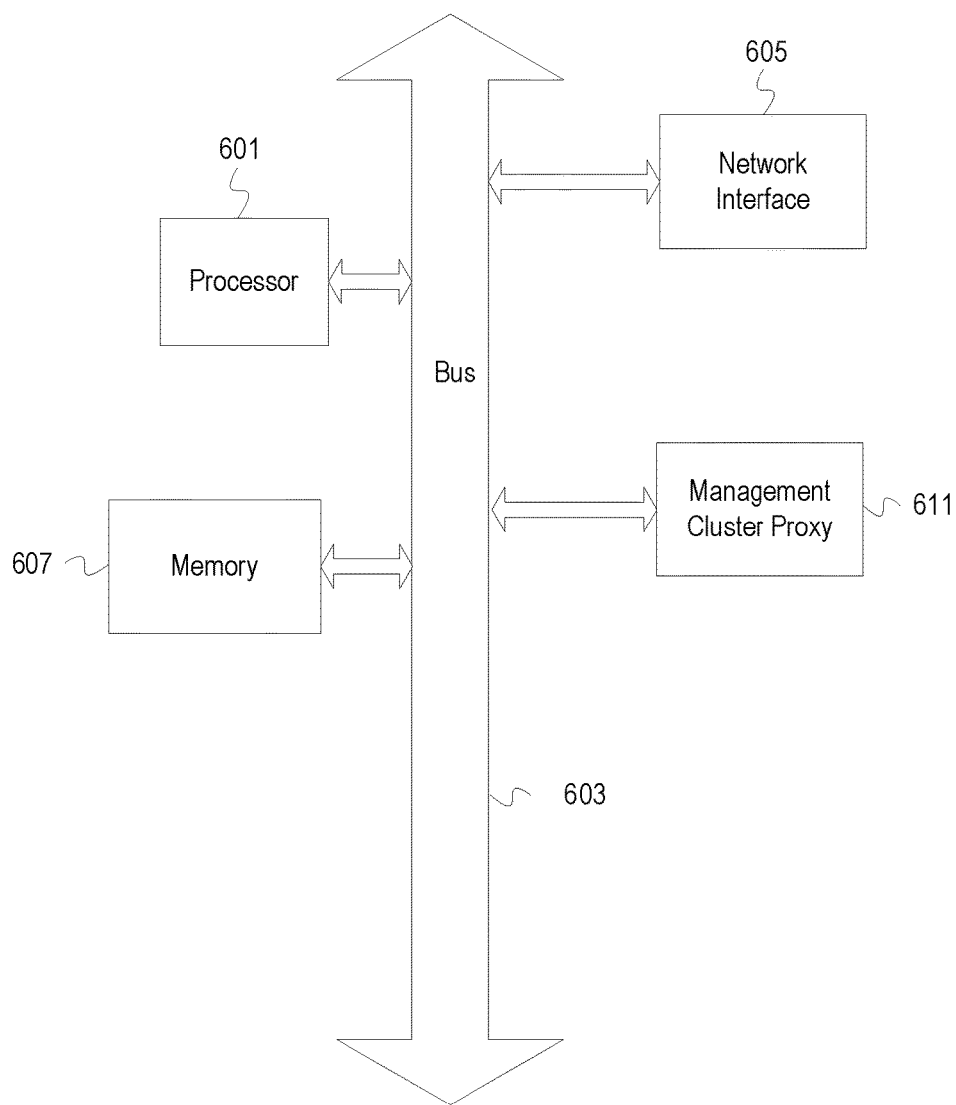
FIG. 6 depicts an example computer device, according to some embodiments.

FIG. 6 depicts an example computer device, according to some embodiments. The computer device includes a processor 601 (possibly including multiple processors, multiple cores, multiple nodes, and/or implementing multi-threading, etc.). The computer device includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer device also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The computer device also includes a management cluster proxy 611. The management cluster proxy 611 can proxy operations for processing cluster management requests as described above. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

Variations

While the proxy herein is described in a cluster level, some embodiments can include a proxied SVM interface. With a proxied SVM interface, each request can be tunneled to the SVM context (to the SVM associated with the tenant from which the request originated). In this configuration, the storage service provider could apply policies to both the user's SVM management interface and the cluster management interface (e.g., limiting volume size, forcing volume options, etc.). Thus, the proxied SVM interface could be an alternative to or in addition to the management cluster proxy 105 (as described herein).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted for movement of data blocks between nodes of the data structure can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for sequenced-ordered translation for data storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
receiving, from a tenant by a cluster management proxy, a request to perform a cluster management operation of a cluster that is storing data from multiple tenants that include the tenant;
determining whether the request is within a group of admissible cluster management requests for the cluster;
in response to determining that the request is within the group,
modifying, by the cluster management proxy, the request to restrict access of the cluster management operation based on an identity of the tenant; and
accessing, by the cluster management proxy, the cluster based on the modified request that has restricted access of the cluster management operation; and
in response to determining that the request is not within the group,
tunneling the request to a Storage Virtual Machine (SVM) assigned to the tenant, wherein the SVM is configured to access the cluster based on the request.

2. The method of claim 1, wherein modifying the request comprises limiting an input parameter of the request to at least one value.

3. The method of claim 1, wherein modifying the request comprises forcing an input parameter of the request to a value.

4. The method of claim 1, wherein in response to determining that the request is within the group, the method comprises:
modifying, by the cluster management proxy, a result of the accessing of the cluster based on the modified request.

5. The method of claim 4, wherein modifying the result comprises obfuscating at least a portion of the result.

6. The method of claim 1, wherein modifying the request is based on a rule set that includes at least one rule, wherein the rule set is defined for the tenant.

7. The method of claim 1, wherein modifying the request is based on a rule set that includes at least one rule, wherein the rule set is globally defined for the multiple tenants.

8. One or more machine-readable storage media having program code for management of a cluster stored therein, the program code comprising instructions to:
receive, from a tenant by a cluster management proxy, a request to perform a cluster management operation of the cluster that is storing data from multiple tenants that include the tenant;
determine whether the request is within a group of admissible cluster management requests for the cluster;
in response to a determination that the request is within the group,
modify, by the cluster management proxy, the request to restrict access of the cluster management operation based on an identity of the tenant; and
access, by the cluster management proxy, the cluster based on the modified request that has restricted access of the cluster management operation; and
in response to a determination that the request is not within the group,
tunnel the request to a Storage Virtual Machine (SVM) assigned to the tenant, wherein the SVM is configured to access the cluster based on the request.

9. The one or more machine-readable storage media of claim 8, wherein the program code comprising instructions to modify the request comprises program code comprising instructions to limit an input parameter of the request to at least one value.

10. The one or more machine-readable storage media of claim 8, wherein the program code comprising instructions to modify the request comprises program code comprising instructions to force an input parameter of the request to a value.

11. The one or more machine-readable storage media of claim 8, wherein in response to the determination that the request is within the group, the program code comprises instructions to:
   modify, by the cluster management proxy, a result of the access of the cluster based on the modified request.

12. The one or more machine-readable storage media of claim 11, wherein the program code comprising instructions to modify the request comprises program code comprising instructions to obfuscate at least a portion of the result.

13. The one or more machine-readable storage media of claim 8, wherein the program code comprising instructions to modify the request comprises program code comprising instructions to modify the request based on a rule set that includes at least one rule, wherein the rule set is defined for the tenant.

14. The one or more machine-readable storage media of claim 8, wherein the program code comprising instructions to modify the request comprises program code comprising instructions to modify the request based on a rule set that includes at least one rule, wherein the rule set is globally defined for the multiple tenants.

15. An apparatus comprising:
   a processor; and
   a machine-readable medium having program code executable by the processor to cause the apparatus to,
      receive, from a tenant, a request to perform a cluster management operation in a cluster that is configured to store data from multiple tenants that include the tenant;
      determine whether the request is in a Storage Virtual Machine (SVM) context;
      in response to a determination that the request is in the SVM context,
         validate an identification of an SVM that is included with the request based on an identification of the tenant,
         in response to the identification of the SVM being validated,
            transmit the request to the SVM; and
            receive a result of the request back from the SVM; and
            return the result to the tenant;
      in response to a determination that the request is in a cluster context,
         determine whether the request is within a group of admissible cluster management requests for the cluster;
         in response to a determination that the request is within the group,
            modify the request to restrict access of the cluster management operation based on the identification of the tenant;
            access, while remaining in the cluster context, the cluster based on the modified request that has restricted access of the cluster management operation; and
            return the result to the tenant; and
         in response to a determination that the request is not within the group,
            change the request from the cluster context to the SVM context;
            tunnel the request to the SVM assigned to the tenant;
            receive the result of the request back from the SVM; and
            return the result to the tenant.

16. The apparatus of claim 15, wherein the program code executable by the processor to cause the apparatus to modify the request comprises program code executable by the processor to cause the apparatus to limit an input parameter of the request to at least one value.

17. The apparatus of claim 15, wherein the program code executable by the processor to cause the apparatus to modify the request comprises program code executable by the processor to cause the apparatus to force an input parameter of the request to a value.

18. The apparatus of claim 15, wherein in response to the determination that the request is within the group, the program code comprises program code executable by the processor to cause the apparatus to:
   modify, by the cluster management proxy, a result of the access of the cluster based on the modified request.

19. The apparatus of claim 18, wherein the program code executable by the processor to cause the apparatus to modify the request comprises program code executable by the processor to cause the apparatus to obfuscate at least a portion of the result.

20. The apparatus of claim 15, wherein the program code executable by the processor to cause the apparatus to modify the request comprises program code executable by the processor to cause the apparatus to modify the request based on a rule set that includes at least one rule, wherein the rule set is defined for the tenant.

* * * * *